United States Patent
Pack et al.

(10) Patent No.: US 11,533,321 B2
(45) Date of Patent: *Dec. 20, 2022

(54) SECURE DECENTRALIZED FILE SHARING SYSTEMS AND METHODS

(71) Applicant: TOPIA TECHNOLOGY, INC., Tacoma, WA (US)

(72) Inventors: Jeffrey Austin Pack, Puyallup, WA (US); John Christopher Haager, Bonney Lake, WA (US); Cody Joseph Sandwith, Tacoma, WA (US); Janine Therese Terrano, Gig Harbor, WA (US)

(73) Assignee: Topia Technology, Inc., Tacoma, WA (US)

( * ) Notice: Subject to any disclaimer, the term of this patent is extended or adjusted under 35 U.S.C. 154(b) by 194 days.

This patent is subject to a terminal disclaimer.

(21) Appl. No.: 16/993,945

(22) Filed: Aug. 14, 2020

(65) Prior Publication Data

US 2020/0374296 A1    Nov. 26, 2020

Related U.S. Application Data

(63) Continuation of application No. 16/119,651, filed on Aug. 31, 2018, now Pat. No. 10,749,879.
(Continued)

(51) Int. Cl.
*H04L 9/40* (2022.01)
*H04L 9/30* (2006.01)
(Continued)

(52) U.S. Cl.
CPC .............. *H04L 63/126* (2013.01); *H04L 9/30* (2013.01); *H04L 9/3236* (2013.01);
(Continued)

(58) Field of Classification Search
CPC ..... H04L 63/0428; H04L 63/126; H04L 9/30; H04L 9/3236
(Continued)

(56) References Cited

U.S. PATENT DOCUMENTS 9,990,502 B2    6/2018    Haager et al.
10,079,881 B2    9/2018    Cohn
(Continued)

FOREIGN PATENT DOCUMENTS

WO    2016177026 A1    11/2016

*Primary Examiner* — Dant B Shaifer Harriman
(74) *Attorney, Agent, or Firm* — Sughrue Mion, PLLC

(57) ABSTRACT

In an embodiment, a request for hosting a blockchain may be obtained from a client device. A node device to host the blockchain may be determined. Information associated with the node device may be provided to the client device, where the information is used for creating the blockchain on the node device. First data may be obtained from the client device and second data may be obtained from the node device for verifying that the node device hosting the blockchain complies with a hosting verification condition. Based on the first data, the second data, and the hosting verification condition, hosting information associated with the node device may be determined. Based on the hosting information, the node device may be removed from a set of node devices for hosting the blockchain.

20 Claims, 8 Drawing Sheets

Related U.S. Application Data

(60) Provisional application No. 62/552,912, filed on Aug. 31, 2017.

(51) Int. Cl.
*H04L 9/32* (2006.01)
*H04L 67/104* (2022.01)
*H04L 9/00* (2022.01)

(52) U.S. Cl.
CPC ............ *H04L 63/0428* (2013.01); *H04L 9/50* (2022.05); *H04L 67/104* (2013.01)

(58) Field of Classification Search
USPC ........................................................ 713/168
See application file for complete search history.

(56) References Cited

U.S. PATENT DOCUMENTS

| | | |
|---|---|---|
| 10,257,270 B2 | 4/2019 | Cohn |
| 10,585,657 B2 | 3/2020 | Padmanabhan |
| 2005/0198535 A1 | 9/2005 | Basche et al. |
| 2009/0172824 A1 | 7/2009 | Colburn |
| 2016/0044000 A1 | 2/2016 | Cunningham |
| 2017/0200137 A1 | 7/2017 | Vilmont |
| 2017/0243213 A1* | 8/2017 | Castinado ............. H04L 9/3236 |
| 2017/0279783 A1 | 9/2017 | Milazzo et al. |
| 2017/0307387 A1 | 10/2017 | Kohlhepp |
| 2017/0344983 A1 | 11/2017 | Muftic |
| 2017/0346639 A1 | 11/2017 | Muftic |
| 2017/0347253 A1 | 11/2017 | Clawsie et al. |
| 2018/0025181 A1 | 1/2018 | Barinov et al. |
| 2018/0196694 A1 | 7/2018 | Banerjee et al. |
| 2018/0255130 A1 | 9/2018 | Kozloski et al. |
| 2019/0068615 A1* | 2/2019 | Pack ..................... H04L 63/126 |
| 2019/0228406 A1 | 7/2019 | Patel et al. |
| 2019/0268284 A1 | 8/2019 | Karame et al. |
| 2019/0327180 A1 | 10/2019 | Todd et al. |
| 2020/0201679 A1* | 6/2020 | Wentz ..................... G06F 9/468 |
| 2020/0374296 A1* | 11/2020 | Pack ..................... H04L 63/126 |
| 2021/0350343 A1* | 11/2021 | Gaur .................. G06Q 20/0655 |

* cited by examiner

SECURE DECENTRALIZED FILE SHARING SYSTEMS AND METHODS

RELATED APPLICATIONS

This application is a continuation of U.S. application Ser. No. 16/119,651, filed on Aug. 31, 2018, which claims the benefit of U.S. Provisional Patent Application Ser. No. 62/552,912, filed on Aug. 31, 2017, entitled "Secure Distributed File Sharing," the disclosures of which are hereby incorporated by reference in their entireties.

FIELD OF THE INVENTION

The invention relates generally to systems and methods associated with secure decentralized file sharing and secure decentralized file sharing networks, including, for example, providing secure, point-to-point data sharing of data across a decentralized network.

BACKGROUND OF THE INVENTION

Traditional file sharing systems involve one or more client devices and a centralized server. A client device may upload files to the server to be stored. The files may be retrieved by and/or shared with other client devices. Typically, sharing the files includes a client device having permissions to access the files submitting a request for the server to send the files, or a link to the files, to the desired destination. To secure the files being transmitted to/from the server, various known encryption techniques and/or security protocols, such as SSL/TLS protocols, may be employed. However, even with such security measures, vulnerabilities to the data in transit exist. Further, security of the server from attacks also can also be of concern.

One solution proposed is the formation and employment of a decentralized system. Although blockchain techniques have been utilized to provide data security for decentralized systems, blockchains are limited in their abilities to store high volumes of data, and current techniques lack the ability to provide application-level data sharing. Further still, existing blockchain solutions focus on allowing a user to access and store his/her files, as opposed to being able to securely share files with others.

SUMMARY OF THE INVENTION

Aspects of the invention, as described herein, generally relate to methods, apparatuses, programming instructions, and/or systems for providing secure decentralized file sharing networks.

In some embodiments, a request for hosting a blockchain may be obtained from a client device. A node device may be determined to host the blockchain. Information associated with the node device may be provided to the client device. The information may be used for creating the blockchain on the node device. First data may be obtained from the client device and second data may be obtained from the node device for verifying that the node device hosting the blockchain complies with a hosting verification condition. Based on the first data, the second data, and the hosting verification condition, a hosting infraction associated with the node device may be determined. Based on the hosting infraction, the node device may then be removed from a set of node devices for hosting the blockchain.

In some embodiments, a request may be provided to a computing system for hosting a blockchain. Notification of a node device to be used to host the blockchain may be obtained from the computing system. A value may be provided to the node device, where the value is written to a block of a blockchain hosted by the node device. First data may be generated based on the value. The computing system may then provide the first data for verifying that the node device remains available to host the blockchain, where the computing system performs the verifying based on the first data and second data obtained from the node device.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

Figure 1:
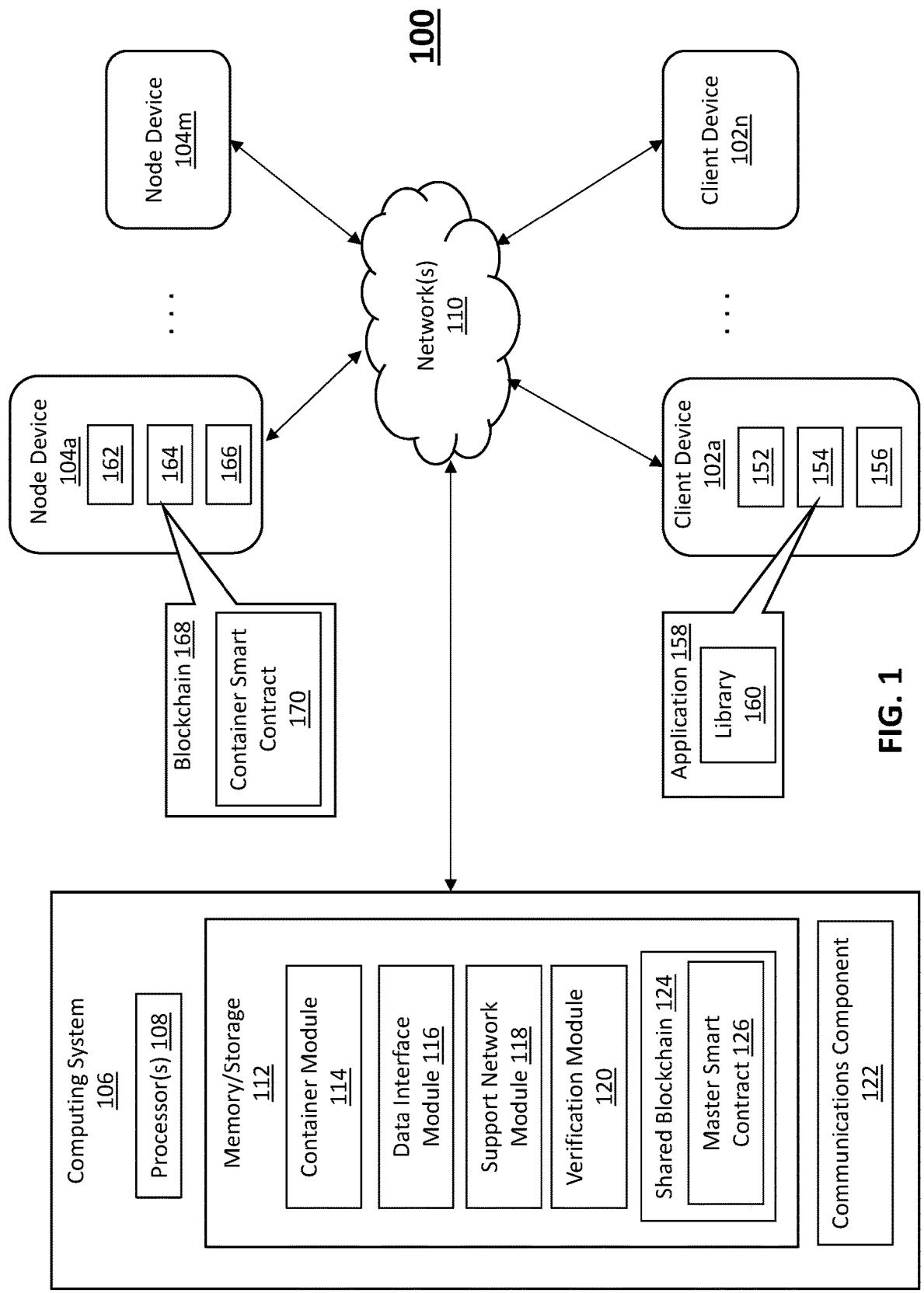
FIG. 1 is an illustrative diagram of a secured decentralized file sharing network, in accordance with various embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Traditional file sharing systems are client-server based. In such systems, a client connects to a centralized server to upload and/or download data. The centralized server stores and manages files, ensuring access only to those client devices with permission. One drawback of these centralized servers is that users must trust that the server's access retains integrity (e.g., data is not breached or becomes accessible to unauthorized devices, a provider for the server is not snooping through stored data, etc.), in addition to the increased performance demands of the centralized server's consumers. Although client-side encryption has been utilized to deal with such integrity issues, such techniques may limit the search capabilities of the centralized server.

Distributed file sharing systems allow users to transfer data using peer-to-peer networks. These file sharing systems allow users to communicate directly with one another's respective devices to transmit files. While this technique can increase data transfer speed, drawbacks exist here as well. For instance, trust in a peer is difficult to gauge, and the files transmitted across a network can allow an attacker to intercept, compromising file security. One technique for providing end-to-end data encryption is by shredding and encrypting the data. An example of shredding and encrypting data for end-to-end encryption is described in U.S. Pat. No. 9,990,502, entitled "Systems and Methods for Security Hardening of Data in Transit and at Rest via Segmentation Shuffling and Multi-key Encryption," which issued on Jun. 5, 2018, the disclosure of which is incorporated herein by reference in its entirety.

Shredding and encrypting data may allow a file (e.g., data) to be transferred securely from a first client device to a second client device. In an example embodiment, the file may be stored within memory of the first client device. The file may be segmented into a plurality of file segments of similar or differing size. For instance, each file segment may correspond to a segment of data representing the file. In one embodiment, the file segments may be encrypted as each file segment is generated. Alternatively, the file segments may be encrypted after all the file segments have been generated. In some embodiments, a cryptographic hash of each file segment may be obtained prior to the file segment being encrypted, which may be used to verify the file transfer and decrypt the file segments on the second (e.g., recipient) client device.

Each file segment may have an encryption key and an initialization vector generated therefore. For example, the encryption key may be 128 bits or 256 bits, and the initialization vector may be 128 bits. In one embodiment, a random number generator may generate the encryption key and initialization vector for each file segment independently of one another. Using the encryption key and initialization vector, each respective file segment may be encrypted. For example, the encryption key and initialization vector may be used to encrypt a file segment using a cipher block chaining technique whereby the initialization vector acts as an input to an encryption algorithm to ensure that identical or nearly identical unencrypted file segments are encrypted to non-identical encrypted file segments. As another example, the encryption of a file segment may be performed using an electronic code book cipher. Other encryption techniques may additionally or alternatively be employed.

After encryption of each file segment, the file segment's size and a cryptographic hash of that file segment may be collected by the first client device. This information may then be combined with the previously collected information from before the encryption process, and the combined information may be encrypted using a master key associated with a container defining users that may access the file. As an example, the master key may correspond to a 128-bit or 256-bit AES key. Further, the master key may be shared amongst the users capable of accessing the container. File description data may be generated including metadata associated with the original file, a listing of the file segments, and the information associated with each file segment. The first client device may then send the file description data to an intermediate file transfer server or directly to the second client device. In the first scenario, the intermediate file transfer server may determine whether any of the file segments are already stored thereon, and/or may be configured to obtain any file segments not already stored thereon.

The second device may obtain the file segments directly (e.g., the second scenario described above) or via the intermediate file server. In either case, the second client device may download the file description data (e.g., from the intermediate file server or from the first client device). The second client device may then use the master key to decrypt the information collected about each of the encrypted file segments. The second client device may then retrieve, if not already stored within the second client device's memory, encrypted file segments. Upon determining that all of the file segments are available locally on the second client device, each file segment may be decrypted using that file segment's correspond key stored within the file description data previously decrypted. The file segments may then be recombined to form the file. In some embodiments, verification of each file segment may be performed as well by verifying the cryptographic hash of the unencrypted file segments indicated within the file description data.

Systems, methods, and programming described herein relate to secure decentralized file sharing ("SDFS") techniques that combine the performance benefits of peer-to-peer systems with the security benefits of centralized server systems while also introducing ground up client-side filed encryption to secure data to be transferred. In some embodiments, the techniques described herein may leverage peer-to-peer data transfer capabilities to allow shared files to be transferred securely and safely to authorized members of a shared workspace. In some embodiments, the aforementioned techniques may employ security aspects such as shredding and encrypting. It should be noted that, although some embodiments are described herein with respect to the use of blockchain and blockchain technologies, other digital ledgers and ledger technologies may be utilized in lieu of blockchains and blockchain technologies in other embodiments.

In some embodiments, a container (which may be referred to herein interchangeably as a "workspace") may be defined. After a container is established, files and/or digital assets may be added to the container. In some embodiments, the transfer of the data that forms such files may be performed using peer-to-peer file transfer techniques. Each action performed within the container may be recorded using a blockchain that is shared with each member of that container. The actions may represent the various activities performed within the container, such as adding members, adding files, removing members, editing files, etc. A blockchain may include one or more blocks, where each block may include one or more transactions (e.g., blockchain transactions). In some embodiments, each of the blocks may be linked to an immediately prior block of that blockchain. In some embodiments, each block may hold batches of valid transactions that are hashed and encoded (e.g., into a Merkle tree or other tree). Each block may also include the hash of the immediately-prior block of the blockchain, thereby linking the two blocks. The iterative process to form the chain of blocks confirms the integrity of the previous block, all the way back to the original genesis block. By storing data across its network, the decentralized blockchain eliminates the risks that come with data being held centrally. Specifically, for example, the decentralized blockchain lacks centralized points of vulnerability that can be exploited, as well as a central point of failure that can bring down the entire network. In some embodiments, digital ledger security may include the use of public-key cryptography. In some embodiments, a public key associated with a user may be used as an address on a blockchain or other ledger. A private key (corresponding to the public key) may be used by the user to access to the user's digital assets or otherwise interact with the blockchain (or other ledger). Furthermore, in some embodiments, each of the blocks may be secured using one or more encryption means, as described herein.

Each action performed within the container updates the blockchain with a corresponding transaction representative of the performed action. Members of the container may obtain copies of each update to the blockchain. This may allow an end user to reconstruct the container's current state. The blockchain may store and secure metadata associated with the container, as well as of the transactions. In some embodiments, all transactions may be digitally signed by the user that performed the corresponding action, thereby generating a secure audit log of all activity by members within a given container.

In some embodiments, a member of a container may share a digital asset with another member of the container by employing the aforementioned shredding and encrypting techniques. Using the shredding and encrypting technique, in conjunction with the blockchain functionality, allows members to share digital assets without requiring a centralized server. Additionally, by employing the aforementioned techniques, each transactions validity is ensured.

FIG. 1 is an illustrative diagram of a secured decentralized file sharing system, in accordance with various embodiments. As shown in FIG. 1, secured decentralized file sharing ("SDFS") network 100 may include client devices 102a-102n, node devices 104a-104m, and a computing system 106. Client devices 102a-102n may collectively be referred to herein as client device(s) 102; node devices 104a-104m may collectively be referred to herein as node device(s) 104; and computing system 106 may be configured to communicate with client device(s) 102 and/or node device(s) 104 via one or more networks 110. Network(s) 110 may include a single network or a combination of different networks. For example, network(s) 110 may correspond to a local area network ("LAN"), a wide area network ("WAN"), a public network, a private network, a proprietary network, the Internet, an intranet, a virtual network, and/or any combination thereof. In some embodiments, various security mechanisms may be implemented to secure communications (e.g., data transmitted across network(s) 110). For example, transport layer security ("TLS") and/or Secure Sockets Layer ("SSL") protocols may employed for securing data transmissions to/from one or more of client device(s) 102, node device(s) 104, and/or computing system 106.

In some embodiments, client device(s) 102 may correspond to any suitable device capable of connecting to network(s) 110 and/or communicating with one or more of node device(s) 104 and computing system 106. For instance, and without limitation, client device(s) 102 may correspond to mobile devices such as mobile phones, smartphones, tablets, mobile computing devices (e.g., laptops), personal digital assistances ("PDAs"), gaming consoles/devices, wearable devices (e.g., smart watches, broaches, headphones, virtual reality viewing devices), smart televisions, smart content delivery systems, voice/touch activated devices, smart electrical switches, smart accessories (e.g., light bulbs, light switches, etc.), desktop computing devices, and/or networked transportation devices (e.g., automobiles, trains, planes, etc.). In some embodiments, client device(s) 102 may be cloud computing systems, virtual computing devices, distributed computing systems, and the like.

Each client device 102 may include including one or more processors 152, memory/storage 154, and a communications component 156. Processor(s) 152 may include a central processing unit ("CPU"), a graphic processing unit ("GPU"), one or more microprocessors, a digital signal processor, or any other type of processor, or any combination thereof. In still further embodiments, the functionality of processor(s) 152 may be performed by one or more hardware logic components including field-programmable gate arrays ("FPGA"), application specific integrated circuits ("ASICs"), application-specific standard products ("ASSPs"), system-on-chip systems ("SOCs"), complex programmable logic devices ("CPLDs"), or other hardware logic components.

Memory/storage 154 may include one or more types of storage mediums such as any volatile or non-volatile memory, or any removable or non-removable memory. For example, information may be stored using computer program instructions, data structures, and/or program systems. Various types of storage/memory may include hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the memory may be implemented as computer-readable storage media ("CRSM"), which may be any available physical media accessible by processor(s) 152 to execute one or more computer program instructions stored within memory/storage 154.

In some embodiments, memory/storage 154 may store an application 158 including a library 160. Application 158 may correspond to one or more computer program instructions that perform particular tasks associated with SDFS network 100. Application 158 of client device 102 may enable data exchange with other instances of application 158 residing on other client devices 102. Data sent to/obtained from application 158 may be secured using one or more encryption techniques, such as shredding and encrypting as described above. Library 160 may be loaded onto application 158 from any suitable resource of SDFS network 100 (e.g., develops, library repositories, etc.). Library 160 may be employed by application 158 to use an application programming interface ("API") to create a container, add members to the container, and share files.

Communications component 156 may enable client device 102 to communicate with other client device(s) 102, node device(s) 104, computing system 106, and/or any other device, system, server, database, and the like. In some embodiments, communications component 156 may facilitate data transmissions using one or more of Transfer Control Protocol and Internet Protocol ("TCP/IP") (e.g., any of the protocols used in each of the TCP/IP layers), Hypertext Transfer Protocol ("HTTP"), WebRTC, SIP, and/or wireless application protocol ("WAP"). Various additional communication protocols may be used by communications component 156, including Wi-Fi (e.g., 802.11 protocol), Bluetooth, radio frequency systems (e.g., 800 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, VOID, or other communication protocols. Additionally, communications component 156 may include one or more antennas to facilitate wireless communications with network(s) 110 using various wireless technologies (e.g., Wi-Fi, Bluetooth, radiofrequency, etc.). In yet another embodiment, communications component 156 may facilitate data transmissions via one or more universal serial bus ("USB") ports, one or more Ethernet or broadband ports, and/or any other type of hardware access port.

In some embodiments, node device(s) 104 may correspond to any suitable device with available computational resources (e.g., processing resources, memory resources, etc.) for hosting one or more blockchains. In some embodiments, node device(s) 104 may correspond to electronic devices, such as those described above with reference to client device(s) 102. In some embodiments, node device(s) 104 may correspond to devices identified from a set of devices that are designated as being reliable means for hosting blockchains on behalf of users of client devices 102. The set of devices may also be referred herein to as a "support network."

Each node device 104 may offer processing and storage resources for hosting blockchains. By doing so, a client device 102 may not need to run an individual blockchain, allowing the client device to retain processing and storage capabilities. The blockchain may instead be offloaded to node device(s) 104, which—as part of the support network—may be high-powered computing device designated for hosting blockchains and providing data replications. In some embodiments, as detailed below, node devices 104 that are part of the support network may be compensated for offering their functionalities to host blockchains and/or store replicated data.

In some embodiments, a node device 104 may be required to verify their continuing support. For example, node device(s) 104 may stake compensation means (e.g., cryptocurrency amounts) to enroll within the support network. These node devices 104 may periodically be asked to verify that they are available to host blockchains. If a verification infraction is detected (e.g., a node device is unable to satisfy a hosting verification condition, a node device is unable to satisfy a replication challenge, etc.), then a portion of the staked compensation means may be lost. If a particular node device 104 exhibits a certain number of verification infraction occurrences then computing system 106 may be instructed to remove that node device from the support network (e.g., removed from the set of node devices). Additionally or alternatively, a certain number of verification infraction occurrences may cause node device 104's compensation means to fall below a threshold amount, causing that node device to be removed from the support network.

In some embodiments, node device 104 may include one or more processors 162, memory/storage 154, and a communications component 166. Processor(s) 162, memory/storage 154, and communications component 166 may be substantially similar to processor(s) 152, memory/storage 154, and communications component 156, and the previous description may apply. In some embodiments, node device 104 may host a blockchain 168 and a container smart contract 170 within memory/storage 154. Containers for SDFS network 100 may be defined on blockchains, such as blockchain 168, using container smart contract 170. Container smart contract 170 may store metadata associated with the container, as well as the container's membership information.

In some embodiments, computing system 106 may correspond to any suitable device or collection of devices, such as the various types of devices referenced above with respect to client devices 102, capable of facilitating a blockchain setup and verifying that a node device 104 maintains reliability to host blockchains. In some embodiments, computing system 106 may further be configured to facilitate validation support means to node devices 104 that are deemed to remain availability, as well as remove node device(s) 104 from a set of node devices 104 for not maintaining availability.

Computing system 106 may include one or more processors 108, memory/storage 112, and a communication component 122. In some embodiments, processor(s) 108, memory/storage 112, and communications component 122 may be substantially similar to processor(s) 152, memory/storage 154, and communications component 156, and the previous description may apply. Memory/storage 112 may further include one or more computer program instructions that, when executed by processor(s) 108, facilitate the functionalities of a container module 114, a data interface module 116, a support network module 118, and a verification module 120. Furthermore, memory/storage 112 may store a shared blockchain 124 including a master smart contract 126. Master smart contract 126 may be hosted on shared blockchain 124, and may track available node devices, match micro-networks of devices (e.g., devices involved with using private blockchains for storing and exchanging a container's state, and transferring encrypted data chunks) with an available node device of the set of node devices, as well as facilitate compensation for node devices. As described herein, a smart contract may refer to a computer protocol that digitally facilitates, verifies, and/or enforces one or more policies of its members. A client device 102 may request a node device 104 to host a new blockchain by communicating with the smart contract of verification module 120.

Container module 114 may correspond to one or more computer program instructions that assist in creating a container for storing digital assets (e.g., data) that may be shared amongst a set of applications executable on one or more client devices 102 and/or one or more node devices 104. In some embodiments, blockchains may be used to manage such containers to provide cryptographically secure ledgers, where each transaction that occurs within the container is securely recorded. In some embodiments, container module 114 may further include one or more computer program instructs that assist in adding a creator of the container as well as adding one or more other members to the container so that some or all of the digital asset(s) stored therein may be shared.

Data interface module 116 may correspond to one or more computer program instructions that assist/facilitate the transfer of data from a client device 102 to a node device 104, a client device 102 to another client device 102, and a node device 104 to another node device 104, or any combination thereof. Furthermore, data interface module 116 may be employed to encrypt digital assets and/or transactions added, or to be added, to a container.

Support network module 118 may correspond to one or more computer program instructions that identify node devices 104 that are available to host one or more blockchains. Support network module 118 may further include computer program instructions that facilitate the functionalities of master smart contract 126, hosted by shared blockchain 124. Support network module 118 may enable computing system 106 to provide SDFS network 100 with blockchain hosting and data replication services. In one embodiment, a blockchain is required to have at least one active and available node device 104 (and/or client device 102) at any given instant to ensure that SDFS network 100 is able to support the blockchains accessibility to members.

Verification module 120 may correspond to one or more computer program instructions that ensure that available node devices 104 remain available, and verifying that node devices 104 reliably provide services for hosting of blockchains. In some embodiments, verification module 120 may also include one or more computer program instructions for storing, exchanging, and monitoring validation support means in response to positive or negative reliability checks for node devices 104. In some embodiments, verification module 120 may facilitate the removal of one or more node devices 104 that have been determined to exhibit verification infractions, indicating that those node devices 104 are to be removed from the set of node devices.

In some embodiments, verification module 120 may employ master smart contract 126 to establish node devices 104 as being participants of the support network. Verification module 120 may request that support network module 118 locate a node device 104 that is available (e.g., from the set of node devices). After identifying an available node device 104, computing system 106 may contact the available node device 104, request a new blockchain be created, and use the new blockchain to set up a new container (e.g., using container module 114). If replication of data is needed, then the available node device 104 may again access master smart contract 126 to request that another node device be located to be provided with/replicate data. As mentioned previously, and detailed below, periodically node devices 104 may be required to verify that they can continue to host the blockchains, and that the data they have is able to be replicated.

In some embodiments, SDFS network 100 may provide decentralized applications 158, such as client software, with a data layer that enables data exchange between other application instances via a decentralized network. In contrast to traditional client-server systems, as described above, a central repository for storing data need not exist. However, persons of ordinary skill in the art will recognize that a database (or data repository) may exist within SDFS network 100. As mentioned above, SDFS network 100 provides an improvement to the traditional client-server system by eliminating the need for a centralized server. This improvement may be accomplished by a unique combination of blockchain protocols, peer-to-peer data transfer techniques, and data security techniques, as mentioned above.

A common performance issue of public blockchains stems from the size of the blockchain, which may be in the tens to hundreds of gigabytes in size. This tremendous digital footprint renders adding a new node device 104 to host the blockchain difficult, as synchronizing the new node device takes substantial time. To overcome this issue, SDFS network 100 allows the developer to operate outside of the public blockchain, yielding smaller blockchains that run faster, thus improving performance. The developer may refer to one or more client devices 102 that create and/or share content.

SDFS network 100 may be employed in a variety of scenarios to support efficient and secure data sharing and collaboration. Some implementations for SDFS network 100 may include secure messaging, document review and exchange, digital asset delivery, or other implementations. For example, with respect to secure messaging, a secure messaging application could be initiated using SDFS network 100. In this particular scenario, messages between users (e.g., users operating client devices 102) may be encrypted, and each message action (e.g., sending, obtaining, etc.) may be stored in the container's blockchain. Files shared with messages may also be securely uploaded to the container and recorded to the blockchain as well, with edits to files also being recorded as transactions to the blockchain.

Sharing of a digital asset may be accomplished by the SDFS system by providing a secure data layer. By providing a secure data layer, data may be shared between application instances, allowing users to share data with one another, as opposed to traditional blockchain techniques of only storing and accessing a user's own data. The secure data layer further improves existing file sharing techniques by allowing blockchains and digital assets to be shared even when client devices 102 are offline. The data layer of SDFS network 100 may distribute digital assets to other members of network 100, as well as providing replication and availability of the digital assets via node devices 104.

Figure 2:
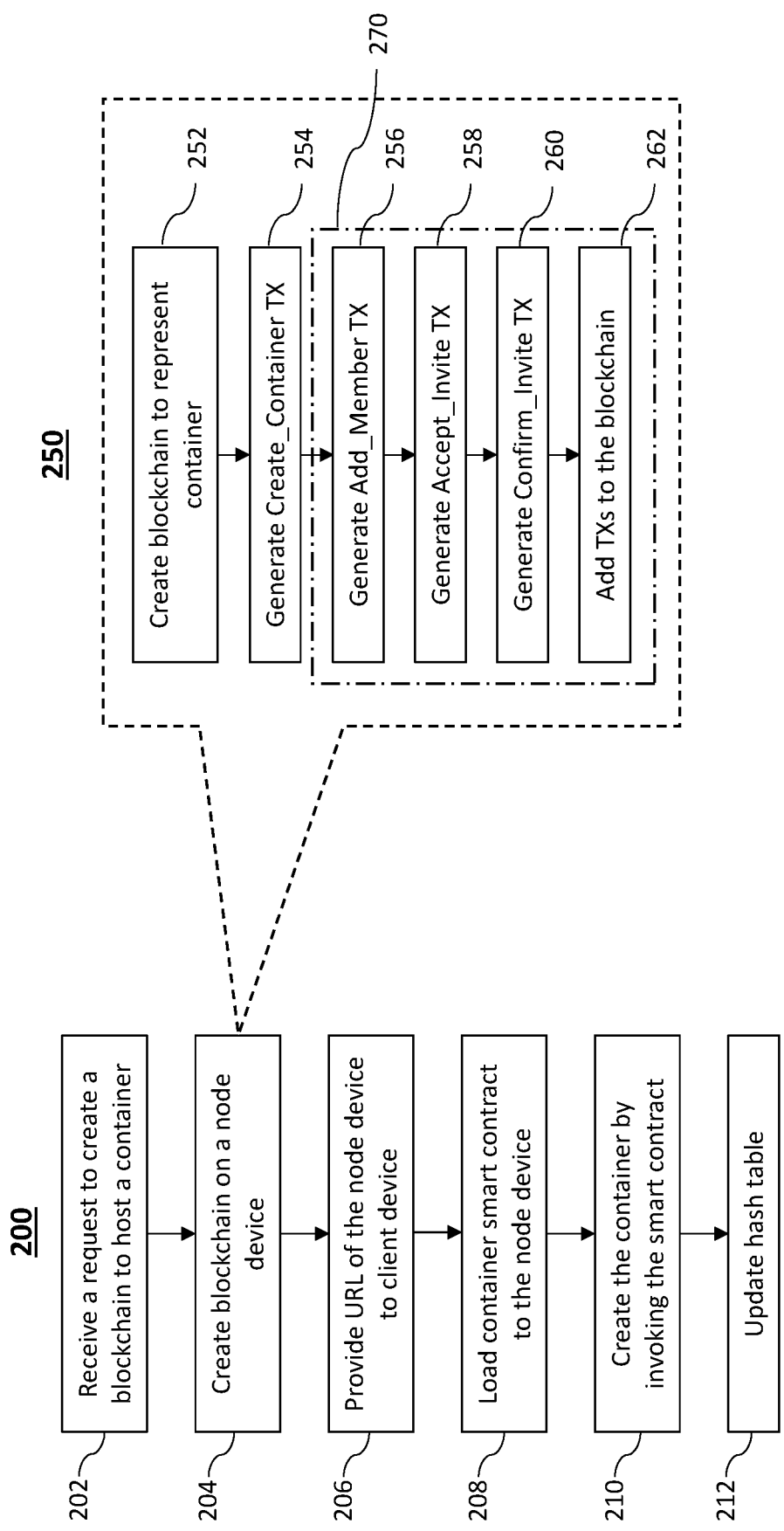
FIG. 2 is an illustrative flowchart of a process for creating a blockchain to be employed within the decentralized file sharing system of FIG. 1, in accordance with various embodiments.

FIG. 2 is an illustrative flowchart of a process for creating a blockchain to be employed within the decentralized file sharing system of FIG. 1, in accordance with various embodiments. At step 202, a request may be obtained to create a blockchain to host a container (or data related to the container). In some embodiments, the request may be obtained from a requesting client device (e.g., client device 102a). The container may correspond to a data structure that will store transactions associated with the blockchain. In some embodiments, the container may be "invitation only," differing from peer-to-peer systems in that members must be invited in order to share data or obtain shared data. Containers may be managed by blockchains, which provide a cryptographically secure digital ledger where all transactions that occur within the container are to be recorded. After a container is established, one or more digital assets may be added to the container. Data representing files and digital assets may be transferred using peer-to-peer data transfer techniques, such as shredding and encrypting techniques mentioned above. In some embodiments, the request may be obtained by application 158, which may initiate the container creation process. In another embodiment, computing system 106 may obtain the request. Container module 114 may facilitate the creation of the container and blockchain by providing computer program instructions to library 160 indicating how to create the container.

At step 204, a blockchain may be created on a node device. In some embodiments, a client device 102a may contact the smart contract of verification module 120 to request a node device to host the blockchain. The smart contract of verification module 120 may communicate with support network module 118 to identify an available node device 104 of a set of node devices 104 (e.g., the support network) capable of hosting blockchains. After support network module 118 identifies the available node device (e.g., node device 104a), computing system 106 may send a request to create a blockchain to node device 104a. Upon successfully creating the blockchain, node device 104a may return a location resource identifier (e.g., an RPC URL) for the blockchain on node device 104a.

At step 206, the location resource identifier (e.g., the RPC URL) may be provided to the client device. In some embodiments, the RPC URL may be provided to library 160. Library 160 may provide a turnkey infrastructure that enables the decentralized, secure, data transfer infrastructure. Library 160 may include the corresponding blockchain's activity and any corresponding peer-to-peer interactions. In some embodiments, library 160 may provide an API for developing end user applications, such as, and without limitations, creation of new containers, adding and replicating digital assets, etc.

At step 208, a container smart contract may be loaded to the available node device. For example, a container smart contract may be loaded to available node device 104a from a corresponding client device 102a. Library 160 may connect to blockchain 168 and may load container smart contract 170 thereon. Container smart contract 170 may store metadata and membership information associated with the container. For example, container smart contract 170 may include information regarding node device 104a that hosts the container and blockchain 168, a name (if any) and description of the container, and metadata indicating the creator of the container (e.g., an identifier associated with client device 102a). Furthermore, the container smart contract may further include an encrypted copy of the container's key. In some embodiments, loading container smart contract 170 to node device 104a may include encrypting and sending container smart contract 170 from library 160 to node device 104a, and storing container smart contract 170 within memory/storage 154.

At step 210, the container may be created on the node device by invoking the container smart contract. Invoking container smart contract 170 may create the container, and may also set up the container's metadata. As a result of the invocation, a record of the container's existence may be made, a name and/or description (if any) for the container may be recorded, and a unique identifier may be assigned—if not already done so—to that container may be recorded.

In some embodiments, library 160 makes sure that the creator of the container (e.g., client device 102a) has been added as a member of the container. To do so, container smart contract 170 may add a record to the container including the creator's (e.g., client device 102a) account name and a copy of the container's key, which may be encrypted with the creator's public key. By doing so, the creator (e.g., a user of client device 102a) may be able to access the container from any device or application they so choose.

At step 212, a hash table may be updated. For instance, library 160 may cause the hash table to be updated. The update to the hash table may indicate the node device or devices that are hosting blockchains and replicating data for a particular container. In some embodiments, the hash table may be a distributed hash table ("DHT") used in decentralized peer-to-peer networks. In some embodiments, the hash table may be stored by computer system 106, for instance within container module 114.

FIG. 2 may further include process 250, which is a sub-process of step 204 of process 200. Process 250 may correspond to the particular steps taken to create the container. In particular, process 250 may correspond to a client-side process associated creating the container. At step 252, a new blockchain representing the container may be created. The new blockchain may be created via library 160 contacting node device 103 to request creation of a blockchain for a new container.

At step 254, a create container transaction (e.g., "Create_Container TX") may be generated. The create container transaction may be generated by client device 102a, and may include basic information about the container. For example, the basic information may correspond to a name and/or description of the container. At step 256, an add member transaction (e.g., "Add_Member TX") may be generated. Client device 102a may generate the add member transaction and may invite the creator (e.g., a user associated with client device 102a) to the container. At step 258, an accept invitation transaction (e.g., "Accept_Invite TX") may be generated. The accept invitation transaction may indicate that the creator has accepted the invitation to be added as a member to the container. At step 260, a confirm invite transaction (e.g., "Confirm_Invite TX") may be generated. The confirm invite transaction may set up the cryptographic keys for the creator. The keys may be stored in the container smart contract (e.g., container smart contract 170). At step 252, the transactions—the create container transaction, the add member transaction, the accept invite transaction, and the confirm invite transaction—may be added to a block of the blockchain.

In some embodiments, in addition to adding the transactions to the block, any required payment receipt transactions associated with any of the aforementioned transactions, may also be added to the block. Furthermore, in some embodiments, the creator may digitally sign the block. As an example, the digital signing may correspond to a cryptographic signature. At this point, the block may be added as a first block of the newly created blockchain. In one embodiment, the creator (e.g., a user operating client device 102a) may add information associated with the newly created blockchain and block to the hash table, as reflected by step 212 of process 200, thereby recording the container's existence in the hash table and recording the creator as a member of the container.

Also seen within process 250 is a sub-process 270 associated with adding a member to a container. The process of adding additional members to a container may be substantially similar to that of adding the creator to the container, as described above with respect to process 250. Adding a new member to a container may allow that member to access information stored within the blockchain and, in some embodiments, further enable that user to download encrypted file data shared among other members of the container. As an illustrative example, to add a new member to a container (e.g., a user operating another client device 102), an inviter (e.g., a current member of the container) may add an add member transaction to the container. The add member transaction may include a public key hash of the to-be-added member. The public key hash, in one embodiment, may be obtained using the application implemented on memory/storage 154 of client device 102. If the member to be added is already a member of another container, the client device's application may use the other container's information to determine a public key hash for the to-be-added member. However, if the to-be-added member is not a member of an existing container, then the client device's application may query other members of the container to determine whether any of those members know of the to-be-added member. If either of the previous two processes does not succeed, the client device application may request that the user operating the corresponding client device manually provide the public key hash to the to-be-added member.

In response to the add member transaction being added to the blockchain, the inviter may notify the to-be-added member using the hash table stored by computer system 106. After obtaining the notification from computer system 106, the to-be-added member may request the blockchain from a current member of the container, and may notify the application. After the invitation has been accepted, an accept invite transaction (e.g., step 258) may be added to the blockchain while the application awaits the inviter to respond with a confirm invite transaction (e.g., step 260). In the example embodiment, the confirm invite transaction may include the container key for the now-added member. The application obtains the confirm invite transaction, or notification thereof, and then may be configured to decrypt the transactions in the blockchain to reconstruct the container in its current state.

In some embodiments, a newly added user may be notified of their new access by the information associated with the newly obtained access being placed on the hash table. In other embodiments, the information may be recorded in a public blockchain. For example, the information may be provided via a direct transaction to the to-be-added user, or via a smart contract hosted on the public blockchain. In yet another embodiment, the information may be recorded on a centralized system. In this particular scenario, client devices 102 of SDFS network 100 may query the centralized system to determine whether they have been invited to any containers.

In some embodiments, one or more members of the container may have their access to the blockchain revoked. In some embodiments, one or more members may additionally or alternatively have their access to encrypted file data (shared amongst members of the container) revoked. Membership to a container may be revoked upon request of one or more other members of the container, or by a member themselves. To remove a member from membership to the container, a transaction is submitted to the blockchain. In one embodiment, the transaction submitted may indicate that the member specified in the request for removal is to be indicated as being removed from membership of the specified container. As a result of this transaction being submitted, the blockchain's state represented for each member may be updated to indicate that the specified user was removed from the container's membership. In some embodiments, by submitting the transaction the removed member may be unable to connect to that member's copy of the blockchain, thus preventing the removed member from being able to retrieve file chunks for digital assets associated with the container. In some embodiments, the remaining members of the container may have a key rotation processes performed to replace the member's old keys with new keys.

Figure 3A:
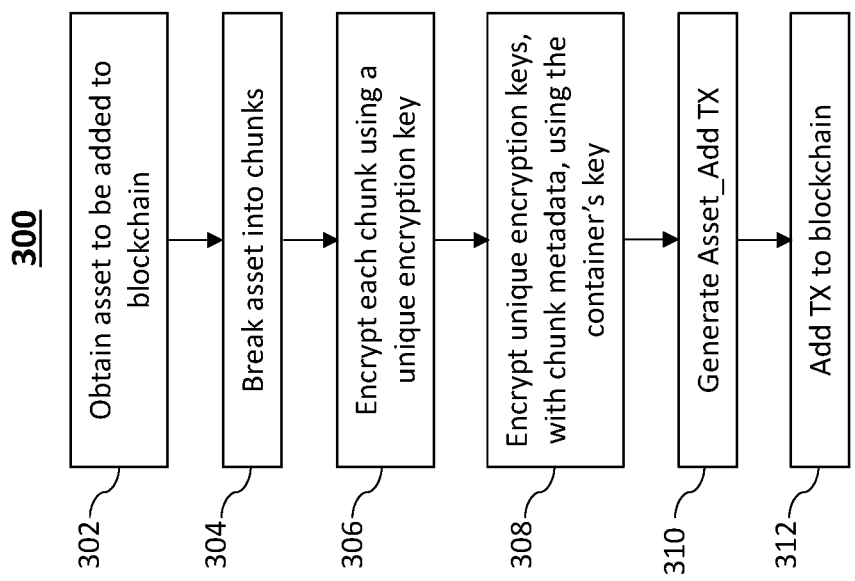
FIGS. 3A and 3B are illustrative flowcharts of processes for adding digital assets to a blockchain and retrieving digital assets from a blockchain, respectively, in accordance with various embodiments.
Figure 3B:
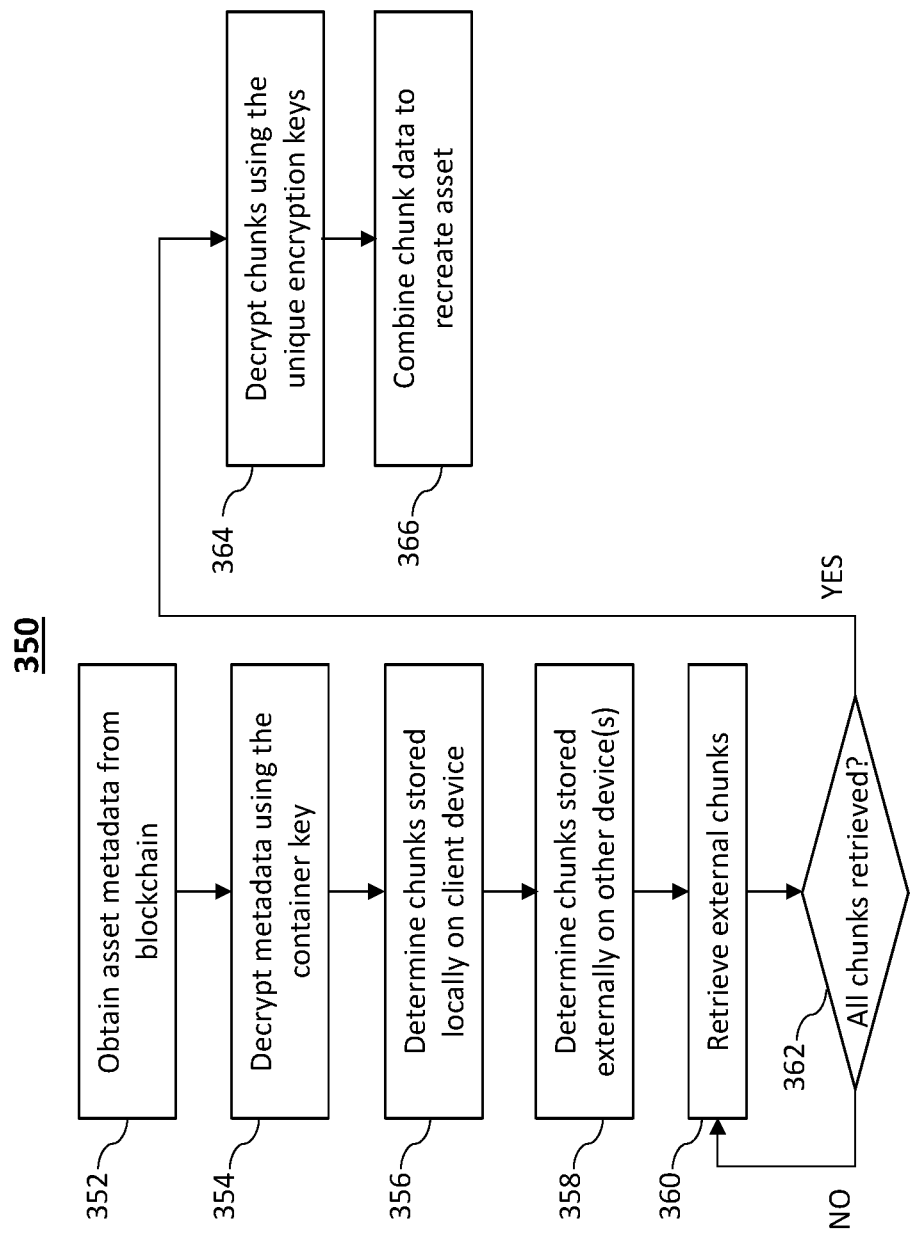

FIGS. 3A and 3B are illustrative flowcharts of processes for adding digital assets to a blockchain and retrieving digital assets from a blockchain, respectively, in accordance with various embodiments. At step 302, a digital asset may be obtained. As an example, the digital asset may correspond to a message (e.g., a secure message sent from one device to another), a message including an attachment, a file including content such as a video, audio, and/or transferable digital items (e.g., electronic tickets), and the like.

At step 304, the digital asset may be broken into chunks. In some embodiments, the chunks may be of a same size (e.g., 500 Kb or other size). At step 306, each chunk may be encrypted using a unique encryption key. At step 308, the unique encryption keys, along with metadata associated with each chunk (e.g., chunk size, hash, etc.) may be encrypted using the container's key. In some embodiments, steps 304-308 may correspond to shredding and encrypting techniques, such as those described by U.S. Pat. No. 9,990,502, entitled "Systems and Methods for Security Hardening of Data in Transit and at Rest via Segmentation Shuffling and Multi-key Encryption," which issued on Jun. 5, 2018, and the disclosure of which is incorporated herein by reference in its entirety.

At step 310, an asset adding transaction (e.g., "Asset_Add TX") may be generated. The asset adding transaction may include metadata associated with the newly added digital asset. At step 312, the asset adding transaction may be added to the blockchain. In some embodiments, the asset adding transaction may correspond to a portion of container smart contract 170. Upon the digital asset being added to blockchain 168, the encrypted chunks of the digital asset may be shared among other members of the container using peer-to-peer communications, as detailed below with respect to FIG. 4.

At step 352, a digital asset's metadata may be obtained. For instance, the digital asset's metadata may be read out of the blockchain. At step 354, the metadata may be decrypted using the container's key. As the requestor knowns the container's key, the desired digital asset's metadata will be accessible. Further, the decrypted metadata may include information regarding which chunks (e.g., via an identifier associated with the chunk) form the reconstructed digital asset.

At step 356, a determination may be made as to whether the client device (e.g., client device 102a), has any of these chunks stored within memory/storage 154. If the client device determines that one or more of the chunks are stored within memory/storage 154, client device 102a may identify that chunk (or chunks). In some embodiments, client device 102a may cache the identified chunk's identifiers. If, in one embodiment, no chunks are determined to be locally stored within memory/storage 154, then process 350 may continue to step 358. However, in some embodiments process 350 may continue to step 350 regardless of whether any chunks are determined to be stored locally.

At step 358, a determination is made as to whether any of the chunks are stored externally. For example, one or more chunks may be stored on another client device(s) 102 and/or node device(s) 104. If any chunks are determined to be stored on any outside device(s) 102 and/or 104, then an instruction to retrieve those chunks may be generated, and processor(s) 152 may execute such an instruction to facilitate retrieval of the chunks. For instance, at step 360, the one or more external chunks may be retrieved from their respective device. A more detailed description of the retrieval process is detailed below with respect to FIG. 4.

At step 362, a determination may be made as to whether all of the chunks have been retrieved, either from local storage and/or external storage. If not, process 350 may return to step 360, where remaining chunks may be retrieved. However, if at step 362 it is determined that all of the chunks have been retrieved, process 350 may proceed step 364. At step 364, the chunks may be decrypted using the unique encryption keys. The unique encryption keys may be described within the metadata associated with the newly added digital asset. In some embodiments, the chunks may be decompressed, if needed. At step 366, the chunks may be combined in order such that the data represented by the chunks may recreate the digital asset that was initially requested.

Figure 4:
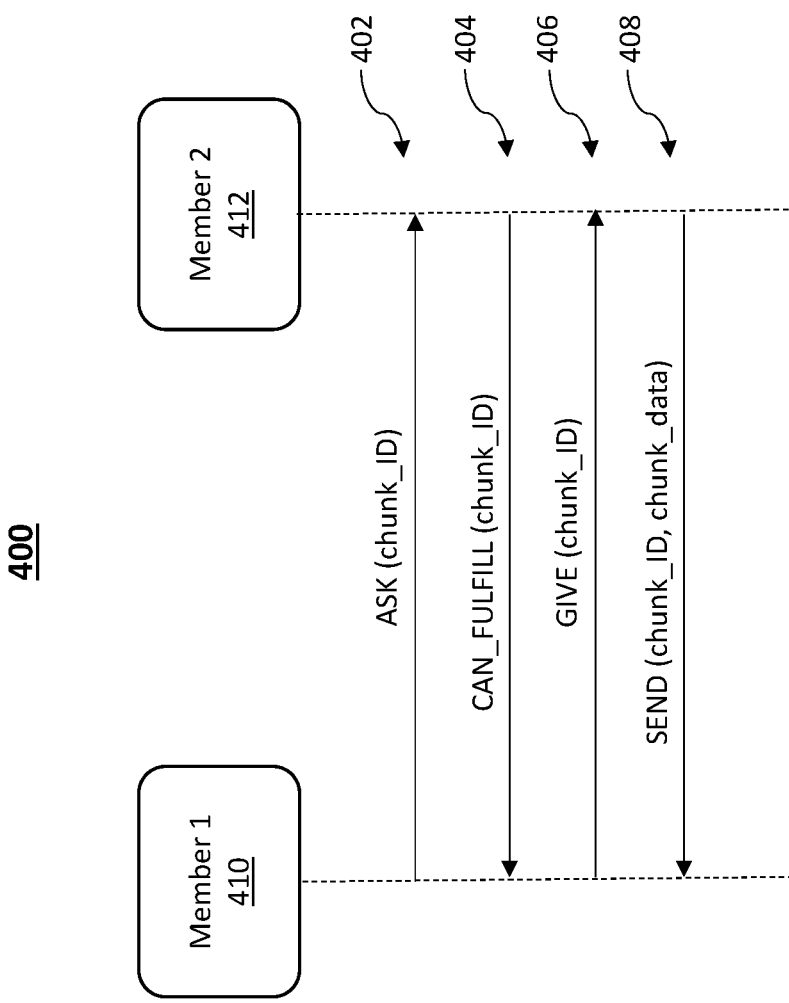
FIG. 4 is an illustrative diagram of a process for transferring data from one node device to another node device, in accordance with various embodiments.

FIG. 4 is an illustrative diagram of a process for transferring data from one node device to another node device, in accordance with various embodiments. In some embodiments, a node device (or a client device) may require data stored by another node device (or client device). For instance, as mentioned above with respect to FIG. 3B, a digital asset may be segmented into chunks, with each chunk encrypted. In some embodiments, one or more of the chunks may be stored on one or more devices. Therefore, when an entity requests a digital asset, any chunks not locally stored may be retrieved from a storing device.

In some embodiments, the transfer of data from one container member's device to another container member's device may be performed using one or more peer-to-peer transmission protocols. For example, Micro Transport Protocol ("µTP"), which corresponds to one type of peer-to-peer data transfer protocol, may be employed to transfer the data from one member device to another. In one embodiment, µTP may enable data to be transferred while conserving bandwidth for other device operations.

As shown in the illustrative embodiment of FIG. 4, transfer environment 400 may include a first member 410—"Member 1," and a second member 412—"Member 2." In the example embodiment, first member 410 may be the "requesting" device (i.e., the device that seeks to obtain data stored externally), while second member 412 may correspond to the "giving" device (i.e., the device that stores the desired data). As an illustrative example, first member 410 may correspond to a client device 102, while second member 412 may correspond to a node device 104, however the data transfer process may alternatively (or additionally) be client to client, node to node, or may involve multiple instances of clients and/or nodes.

In some embodiments, when first member 410 determines that at least some of the chunks of a digital asset are not locally stored, such as at steps 356, 358 of FIG. 3B), first member 410 may attempt to retrieve those chunks from the external devices. However, first member 410 may first need to identify which members (e.g., node devices, client devices) of the container store the desired chunks. In one embodiment, the hash table stored within memory 112 on computing system 106 may be queried to determine a list of node devices associated with the container. For instance, library 160 may implement one or more computer program instructions that facilitate the querying of the hash table, as well as the forming of a query set of devices based on the list of node devices from the hash table combined with a list of all member-owned node devices. After the query set is formed, first member 410 may begin the data transfer process.

The data transfer process of transfer environment 400 may begin with a first step 402, where a request or ask command, is made. For example, first step 402 may include first member 410 (e.g., client device 102) submitting an ASK request to second member 412 (e.g., node device 104), which may specify the chunk desired using that chunk's identifier (e.g., ASK (chunk_ID)). The chunk's identifier may be stored within the hash table and obtained in response to the querying of the hash table. In some embodiments, first member 410 may submit multiple instances of first step 402 to each member device that stores one or more chunks. For example, if a third member device stores another chunk needed for recreation of a digital asset, then first member 410 may submit another ASK request to the third member device.

After the ASK request is obtained by second member 412, second member 412 may determine whether the request chunk is stored locally. In some embodiments, second step 404 may correspond to a response from second member 412 to the request of first step 402. For instance, second member 412 may respond with a notification that second member 412 can fulfill the request (e.g., CAN_FULFILL (chunk_ID)) or cannot fulfill the request (e.g., CANNOT_FULFILL (chunk_ID)).

As shown in the illustrative embodiment, at third step 406, first member 410 may respond to the notification that second member 412 can fulfill the request to provide the desired data with a give request (e.g., GIVE (chunk_ID)). In response to obtaining the give request, at fourth step 408, second member 412 may transmit a send communication to first member 410, which may include the requested chunk's identifier and the requested chunks data (e.g., SEND (chunk_ID, chunk_data)). However, if second member 412 alternatively sent a notification indicating that second member 412 cannot fulfill the request to provide the desired data, then first member 410 may not send the give request, and may instead begin the process of finding the desired data on another member device.

In some embodiments, the messages sent by second member 412 (e.g., second step 404 and fourth step 408) may be digitally signed by second member 412. This may prevent any man-in-the-middle attackers from being able to access the contents of those messages. Upon obtaining the messages (e.g., CAN_FULFILL (chunk_ID), SEND (chunk_ID, chunk_data)), first member 410 may validate the digital signature of second member 412. Once validated, a response to that message may be sent (e.g., third step 406) and/or the data obtained by that message may be processed (e.g., fourth step 408). If, however, first member 410 does not or cannot validate the digital signature accompanying the obtained messages, then those messages may be discarded.

Figure 5:
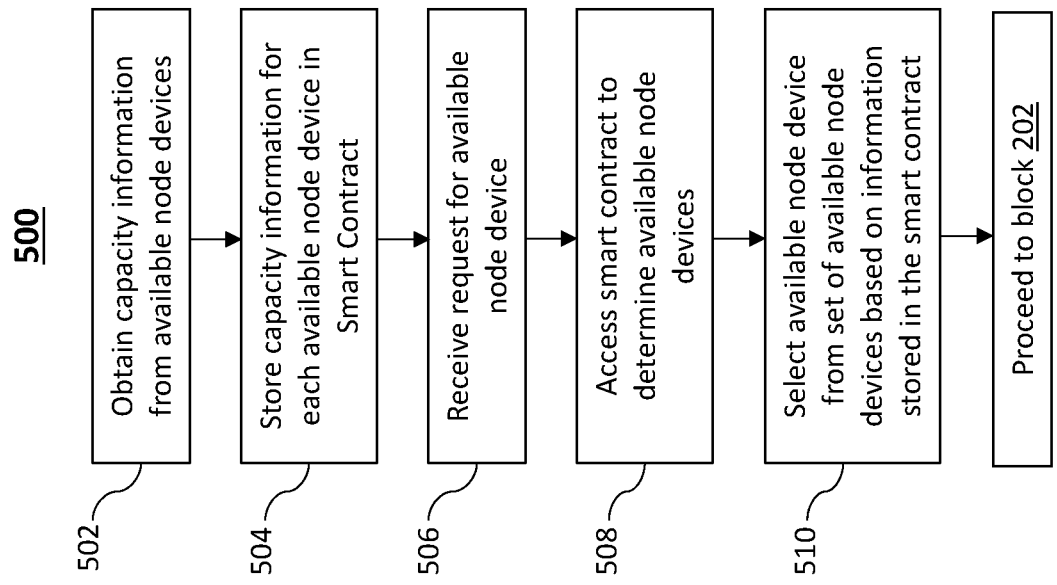
FIG. 5 is an illustrative flowchart of a process for identifying an available node device from a set of node devices to be used for hosting a blockchain, in accordance with various embodiments.

FIG. 5 is an illustrative flowchart of a process for identifying an available node device from a set of node devices to be used for hosting a blockchain, in accordance with various embodiments. As mentioned above, part of the functionality attributed to computer system 106 relates to providing support for SDFS network 100. In some embodiments, support network module 118 may be configured to execute one or more computer program instructions to identify and maintain node devices 104 to host blockchains, store data, and provide distributive services for client devices 102.

In some embodiments, support network module 118 may ensure that one or more node devices 104 are available to offer processing and storage capabilities to client devices 102. For instance, support network module 118 may identify node devices that may host blockchains, as well as nodes that may be used to replicate data (e.g., encrypted data chunks). In a non-limiting embodiment, support network module 118 may access a smart contract 126 hosted on a shared blockchain 124 to coordinate and match client devices and node devices within SDFS network 100. Smart contract 126 may be accessible to all devices within SDFS network 100. In one embodiment, smart contract 126 may be referred to as a master smart contract. Master smart contract 126 may track available node devices that form the set of nodes, may identify a micro-network with a node device 104, and facilitate validation support exchange. Master smart contract 126 therefore assists in ensuring that at least one node device is available at any given time to provide a consistent and coherent state for the blockchain, mitigating issues that would otherwise arise if all members of the micro-network went offline at a same time.

Process 500 of FIG. 5, in a non-limiting embodiment, may begin at step 502. At step 502, capacity information from available node devices may be obtained. In some embodiments, each node device 104 that wants to be included within the set of node devices will provide equity, declare an amount of blockchains that that node can support, and indicate an amount of storage space that that node has available to host encrypted data that is coordinated by master smart contract 126. As an illustrative example, the equity provided may correspond to a pre-defined amount of cryptocurrency provided by an administrator of a node device. At step 504, the capacity information (e.g., the amount of blockchains that a node device can support, the amount of storage space available for hosting encrypted data) may be stored within master smart contract 126. Additionally, the capacity information may further include the provided equity.

At step 506, a request for an available node device may be obtained. In some embodiments, application 158 may submit a request to master smart contract 126 for a node device to be identified for hosting a blockchain (e.g., blockchain 168). As mentioned above, master smart contract 126 may be stored on a shared blockchain 124, and interactions therewith may be facilitated via computer system 106 (e.g., support network module 118). Application 158, for example, may include library 160 stored locally within memory/storage 154, which may initiate contact with master smart contract 126.

At step 508, master smart contract 126 may be accessed to determine available nodes. At step 510, an available node device from the set of node devices based on the capacity information stored within master smart contract 126. In some embodiments, the selection of the node device may include assigning that node device to the new container that will host the blockchain. After step 510, process 500 may proceed to step 202 of FIG. 2 to create the new blockchain (e.g., blockchain 168) on that node device. For instance, the selected node device 104 may have its information provided to library 160, which in turn may submit a request for that node to create a blockchain for the new container.

In some embodiments, application 158 may employ multiple node devices 104 from the set of node devices. The reason being that having multiple node devices available increases the availability of data to requestors and also supports redundancy of that data in case of node device failure, data corruption, and/or any other potential performance issues that may arise. In this particular scenario, process 500 may repeat as many times as needed in order to select the desired number of available nodes.

In some embodiments, instead of requesting a node device 104 to host another blockchain, a request may be made from library 160 to identify a node device 104 to be used for replicating data. In this particular scenario, a similar process to that of process 500 may occur, with the exception that a node device may be selected based on the storage space available for that node device and the expected load of the container whose contents are to be replicated.

Figure 6:
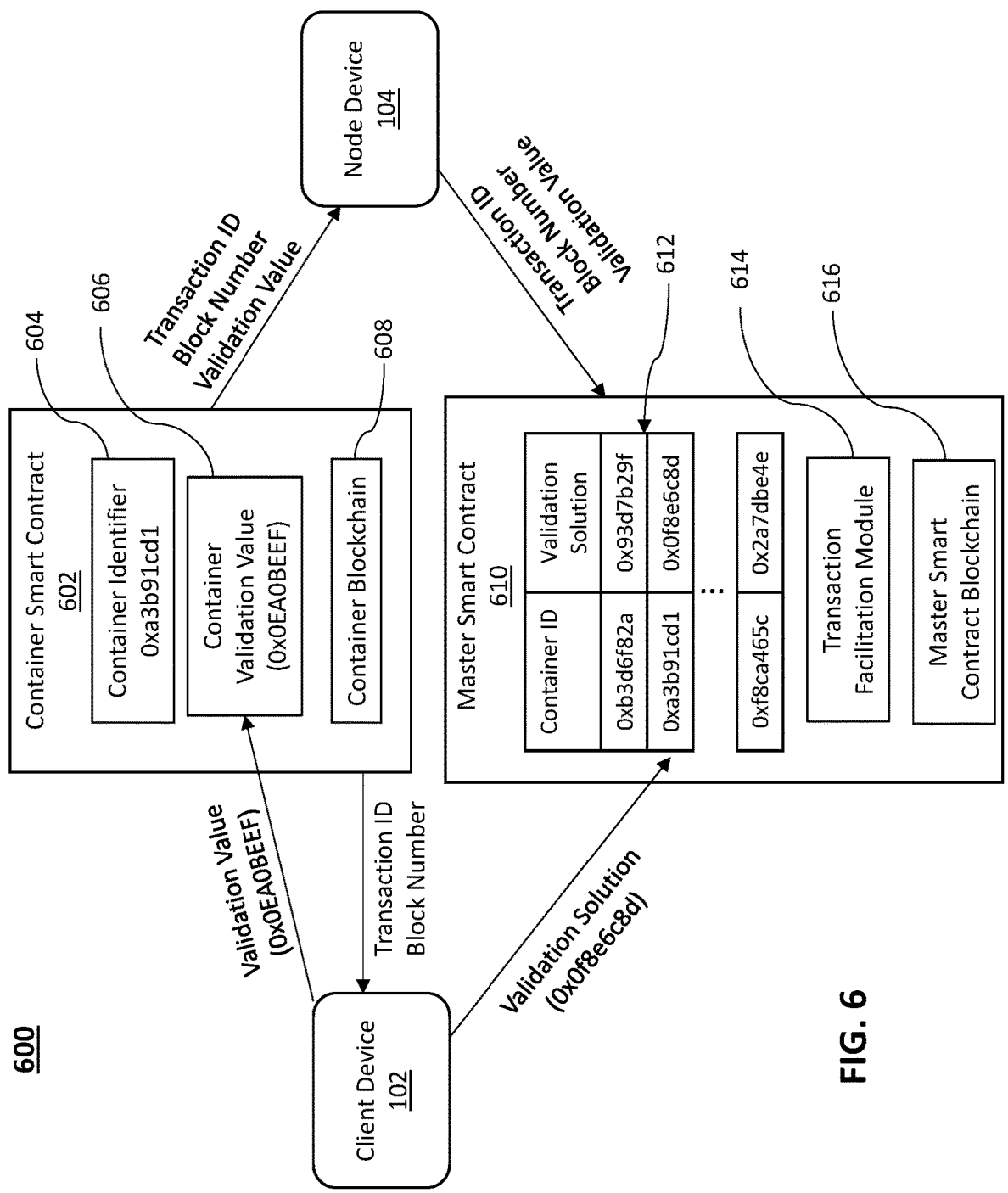
FIG. 6 is an illustrative diagram of a system for verifying hosting of a blockchain by a node device, in accordance with various embodiments.

FIG. 6 is an illustrative diagram of a system for verifying hosting of a blockchain by a node device, in accordance with various embodiments. As illustrated in FIG. 6, a verification system 600 may ensure that node devices hosting blockchains remain trustworthy and available to support their micro-network. In one embodiment, a verification process may be performed to validate and provide that a node device continue to maintain its hosting abilities. Verification system 600 may include a client device 102 and a node device 104. Each of client device 102 and node device 104 may communicate with a container smart contract 602 (e.g., a smart contract loaded to the blockchain of the container that the node device and client device are members of) and a master smart contract 610 (e.g., a master smart contract hosted on a shared blockchain accessible to all members of the container). As an illustrative example, container smart contract 602 may be substantially similar to container smart contract 170 of FIG. 1.

Client device 102 may periodically generate a random value to be used for the verification process. The random value may correspond to a validation value, which may also be referred to interchangeably as a verification value. This validation value may be written to a block of a blockchain 608 of the container, as illustrated by container validation value 606, by library 160. For example, the verification value may be 0x0EA0BEEF, which may be written to container smart contract 602. To write validation value 606 to container smart contract 602, an identifier 604 for the container may be determined so that client device 102 is able to locate container smart contract 602. The writing of the verification value to a block of container blockchain 608 may correspond to a transaction performed to container blockchain 608, and thus may include an associated transaction identifier reflective of the transaction. As mentioned previously, client device 102 may periodically generate/update new random values to be used as the validation value, each of which upon generation may be written to container smart contract 602 by library 160. For example, a new random value may be generated every few minutes, every hour, every few hours, every day, etc. In some embodiments, the transaction identifier and a block number associated with the block of container blockchain 608 (that container validation value 606 was written to) may be returned to client device 102.

After obtaining the transaction identifier and block number, library 160 may be configured to generate a validation solution to be used to determine whether a node device 104 remains valid. The validation solution, for instance, may be generated by hashing container verification value 606 with the transaction identifier, where container verification value 606 was set and the block number of the block that contains the transaction (e.g., writing of container verification value 606). For example, the validation solution may correspond to 0x0f8e6c8d. Upon generation of the validation solution, client device 102 may be configured to send data representing the validation solution to master smart contract 610 for performing the verification.

Node device 104 may periodically access container smart contract 602 to determine a latest transaction where a verification value was written. Upon identifying the latest transaction where the verification value (e.g., verification value 606) was written, node device 104 may obtain verification value 606, the transaction identifier associated with verification value 606 being written to container blockchain 608, and the block number that the transaction identifier is associated with. Node device 104 may be further configured to provide data representing the read verification value, the transaction identifier, and the block number to master smart contract 610. In one example, container blockchain 608 may be substantially similar to blockchain 168 of FIG. 1.

Master smart contract 610 may obtain data representing the validation solution from client device 102, which may be added to a hash table 612 and associated with container identifier 604. Master smart contract 610 may further obtain data representing the read validation value, transaction identifier, and block number from node device 104. In some embodiments, receipt of the data from client device 102 and receipt of the data from node device 104 may be added to master smart contract blockchain 616. For instance, transactions may be written to a block of master smart contract blockchain 616. As an illustrative example, master smart contract 610 may be substantially similar to master smart contract 126 of FIG. 1.

In some embodiments, master smart contract 610 may include a transaction facilitation module 614, which may be implemented using one or more computer program instructions associated with verification module 120. Transaction facilitation module 614 may include logic for verifying/validating that the validation value read by node device 104. In some embodiments, the validation value may be validated by retrieving the validation solution stored within hash table

612 for the corresponding container identifier that node device 104 read the validation value from. Master smart contract 610 may be configured to generate a validation solution using the obtained data representing the validation value, transaction identifier, and block number read by node device 104 from container smart contract 602. If the values match, then this may indicate that node device 104 is maintaining its contracted status, and thus may remain as an available node of the set of nodes. If the values do not match, as detailed below, then a verification infraction may be determined. Alternatively, container validation value 606 may be deciphered using the transaction identifier and block number. Container validation value 606 may then be compared to the validation value obtained from node device 104.

In some embodiments, in response to determining that the verification value read by node device 104 matches container validation value 606, transaction facilitation module 614 may be configured to provide validation support means to node device 104. For example, a pre-defined compensation amount (e.g., cryptocurrency) may be transferred from a compensation cache associated with client device 102 to a compensation cache associated with node device 104. In some embodiments, master smart contract 610 may prevent node device 104 from validating retrieved validation values too frequently to eliminate the possibility of overcompensation. For instance, master smart contract 610 may limit the rate with which validation processing may occur to some temporal duration (e.g., every 2 hours).

Furthermore, in some embodiments, if client device 102 goes offline, node device 104 may still be capable of performing validation. In this particular scenario, client device 102 may not have generated any new random values to be used as an updated validation value. Therefore, node device 104 may read the latest written validation value to container blockchain 608, provide data representing that validation value, its corresponding transaction identifier, and its corresponding block number, to master smart contract 610. Transaction facilitation module 614 may then provide validation support means to node device 104 upon validation of the data provided. After client device 102 returns from being offline, a new validation value may be generated and written to container smart contract 602.

Figure 7:
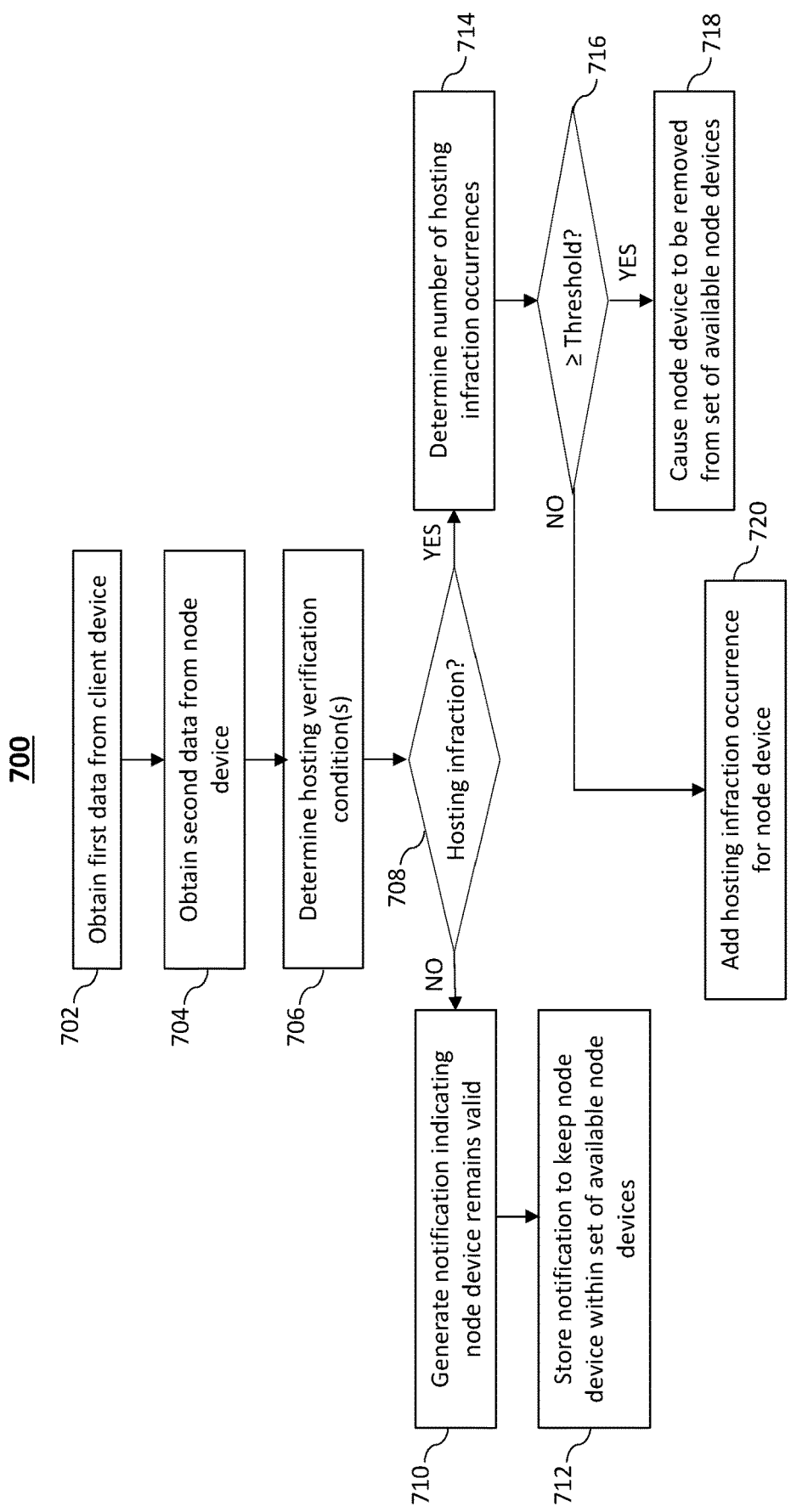
FIG. 7 is an illustrative flowchart of a process for verifying hosting of a blockchain by a node device using a computer system smart contract, in accordance with various embodiments.

FIG. 7 is an illustrative flowchart of a process for verifying hosting of a blockchain by a node device using a computer system smart contract, in accordance with various embodiments. Process 700, in a non-limiting embodiment, may begin at step 702. At step 702, first data may be obtained from a client device. For instance, as mentioned above with reference to FIG. 6, data representing a validation solution may be provided to master smart contract 610 from client device 102. At step 704, second data may be obtained from a node device. Continuing the previous example, data representing a validation value read by node device 104, a transaction identifier associated with that validation value, and a block number associated with the transaction, may be provided to master smart contract 610 from node device 104.

At step 706, one or more hosting verification conditions may be determined. The hosting verification conditions may correspond to criteria by which a node device may be validated as continuing to support the hosting of blockchains and thus remain a node device from the set of node devices that form the support network. For instance, one example verification condition may be that the container validation value retrieved by node device 104 match the container validation value 606 used to generate the validation solution stored by master smart contract 610 within hash table 612.

At step 708, a determination may be made as to whether a hosting infraction has been detected. A hosting infraction may be detected when the validation value retrieved from node device 104 does not match container validation value 606 generated by client device 102. If, at step 708, no hosting infraction was detected, then process 700 may proceed to step 710. At step 710, a notification may be generated that the node device remains valid. For example, if the validation value read by node device 104 matches container validation value 606, then node device 104 may remain within the set of node devices capable of hosting blockchains. At step 712, the notification may be stored with master smart contract 610 and/or container smart contract 602 to indicate that the node device is to remain within the set of node devices. Furthermore, in some embodiments, responsive to determining that no hosting infraction was detected, master smart contract 610 may facilitate providing validation support means to node device 104. As an illustrative non-limiting example, the validation support means may correspond to a form of compensation, such as an exchange of a cryptocurrency.

If, however, at step 708 it is determined that a hosting infraction was detected (e.g., the validation value retrieved by node device 104 does not match container validation value 606), then process 700 may proceed to step 714. At step 714, a number of hosting infraction occurrences may be determined. The number of hosting infraction occurrences may correspond to a number of instances of the validation process for a particular node device yields a hosting infraction. For example, a number of instances where the validation value read by node device 104 does not match the container validation value 606 provided by client device 102. At step 716, the number of hosting infraction occurrences may be compared to a threshold number of occurrences to determine whether the number of occurrences is greater than or equal to the threshold number. If not, process 716 may proceed to step 720, where a hosting infraction occurrence notification is added to a listing of hosting infraction occurrences associated with a particular node device. In some embodiments, the listing of hosting infraction occurrences may be stored by master smart contract 610. However in other embodiments, the listing of hosting infraction occurrences may be stored by container smart contract 602.

If at step 716 it is determined that the number of hosting infraction occurrences is greater than or equal to the threshold number of occurrences, then process 700 may proceed to step 718. At step 718, the verification module 118 may implement logic for master smart contract 610 to cause the node device to be removed from the set of node devices. In some embodiments, a node device removed from the set of node devices may no longer be able to host blockchains, may not be able to access data associated with any digital assets stored by the corresponding container, and may be prevented from providing data to any other devices. Furthermore, in some embodiments, the threshold may alternatively correspond to a validation support amount threshold. For instance, each hosting infraction occurrence may result in a validation support means (e.g., a cryptocurrency) amount that the node device has staked with master smart contract 610 being reduced. If the validation support means amount falls below a threshold amount, then that node device may also be removed from the set of node devices.

In some embodiments, node devices 104 may further be used to store data replications. In this particular scenario, like that of verifying a node device's ability to host a blockchain, an additional verification process for storing replicated data may also be implemented in a manner substantially similar to that of process 700. For instance, a client device that replicated data to a particular node device 104 may trigger a verification process. This verification process may correspond to client device 102 providing a replication challenge to node device 104. For instance, the replication challenge may include client device 102 providing a solution to the challenge to master smart contract 610. Node device 104 may then be tasked with providing the solution to master smart contract 610. If the correct solution is provided by node device 104, then that node device 104 may be validated.

In some embodiments, the replication challenge may include client device 102 generating a cryptographic hash from a portion of one or more of the chunks that it has replicated to a particular node device 104 along with a total amount of data replicated by the node device and a nonce value. Client device 102 may be configured to send the cryptographic has to master smart contract 610 prior to the replication challenge being sent to any node devices 104. The replication challenge may require node device(s) 104 to generate the correct hash value along with the nonce value using the details of the portions of the chunks. Node device(s) 104 may generate a calculated hash of the chunks, and may provide the calculated hash with the nonce value and the total amount of data that the particular node device 104 has stored, to master smart contract 610. Upon receipt of the calculated hash, total amount of replicated data stored, and nonce value from node device 104, master smart contract 610 may determine whether a match has been made. If so, node device 104 may be verified as validly maintaining the replicated data. In some embodiment, upon determining that the replication challenge was successfully passed by a node device, master smart contract 610 may facilitate transfer of validation support means to that corresponding node device. However, failure to successfully pass the replication challenge may cause infractions to be generated and potentially removal of that node device from the set of node devices (e.g., similar to steps 714-720 of FIG. 7).

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining, from a client device, a request for hosting a ledger; determining a node device to host the ledger; providing information associated with the node device to the client device, wherein the information is used for creating the ledger on the node device; obtaining first data from the client device and second data from the node device for verifying that the node device hosting the ledger complies with a hosting verification condition; determining, based on the first data, the second data, or the hosting verification condition, a hosting infraction associated with the node device; and causing the node device to be removed from a set of node devices for hosting the ledger.

2. The method of embodiment 1, further comprising: obtaining availability information associated with the set of node devices; and selecting the node device from the set of node devices based on the availability information, wherein the information provided is generated based on the availability information.

3. The method of any of embodiments 1-2, further comprising: obtaining an additional request from the client device for an additional node device to host the ledger, wherein the additional request comprises ledger information indicating criteria for selecting the additional node device; selecting the additional node device from the set of node devices based on the ledger information; and providing additional information associated with the additional node device to the client device for enabling the additional node device to host the ledger.

4. The method of embodiment 3, further comprising: obtaining, from the client device, a verification solution for confirming that the additional node maintains hosting of the ledger; obtaining, from the additional node device, third data representing a value to be verified with the verification solution; and determining, based on the third data and the verification data, whether the third data satisfies one or more criteria associated with the verification solution.

5. The method of any of embodiments 1-4, further comprising: obtaining the first data associated with a validation value generated by the client device; and obtaining the second data from the node device, the second data being generated based on the validation value and the ledger.

6. The method of embodiment 5, wherein the hosting verification condition comprises a similarity threshold, further comprising: comparing the first data and the second data to determine a difference between the first data and the second data; and determining, based on the difference, that a similarity value of the first data and the second data is less than the similarity threshold.

7. The method of any of embodiments 1-6, further comprising: determining a number of occurrences of differing verification data obtained from the node device and the client device, wherein the node device is caused to be removed from the set of node devices further based on the number of occurrences being greater than or equal to a threshold number of occurrences of differing verification data.

8. The method of any of embodiments 1-7, further comprising: obtaining third data from the client device in response to a new validation value being generated; obtaining fourth data from an additional node device hosting the ledger to check for compliance with the hosting verification condition; and determining, based on the third data, the fourth data, or the hosting verification condition, that the hosting verification condition is satisfied, indicating that the additional node device is to remain within the set of node devices.

9. The method of embodiment 8, further comprising: facilitating, in accordance with a smart contract established between the client device and the node device, a transaction from the client device to the node device responsive to the hosting verification condition being determined to be satisfied.

10. The method of any of embodiments 1-9, further comprising: storing data associated with a container for the ledger hosted by the node device, wherein the data comprises: network device information indicating one or more node devices of the set of node devices that host an instance of the ledger; client device information indicating one or more client devices capable of accessing the ledger stored by the one or more node devices; and creator information indicating the client device that created the ledger.

11. The method of any of embodiments 1-10, wherein the ledger is a blockchain.

12. A method comprising: providing, to a computing system, a request for hosting a ledger; obtaining, from the computing system, notification of a node device to be used to host the ledger; providing a value to the node device, wherein the value is written to a block of the ledger hosted by the node device; generating first data based on the value; and providing, to the computing system, the first data for verifying that the node device remains available to host the ledger, wherein the computing system performs the verifying based on the first data and second data obtained from the node device.

13. The method of embodiment 12, further comprising: obtaining information associated with the first data being written to the block, wherein the first data is generated further based on the information.

14. The method of any of embodiments 12-13, wherein generating the first data comprises: obtaining a transaction identifier associated with a writing transaction of writing the value to the block of the ledger; obtaining a block identifier associated with the block that the value is written to; and hashing the value with the transaction identifier and the block identifier to generate the first data.

15. The method of any of embodiments 12-14, further comprising: providing, based on the notification, an additional request to the node device to create the ledger; obtaining, from the node device, an address identifier for the ledger; and providing a container smart contract to the node device, wherein the container smart contract generates the container for the ledger on the node device and assigns a unique identifier to the container.

16. The method of any of embodiments 12-15, further comprising: adding a record to the container indicating that the client device corresponds to a creator of the container; and adding a record to the container indicating an encrypted key for the container generated based on the unique identifier and a public key associated with the creator.

17. The method of any of embodiments 12-16, wherein the ledger is a blockchain.

18. A tangible, non-transitory, machine-readable medium storing instructions that when executed by a data processing apparatus cause the data processing apparatus to perform operations comprising those of any of embodiments 1-17.

19. A system comprising: one or more processors; and memory storing instructions that when executed by the processors cause the processors to effectuate operations comprising those of any of embodiments 1-17.

What is claimed is:

1. A client device, comprising:
   a memory comprising one or more computer program instructions; and
   at least one processor configured to, in response to executing the one or more computer program instructions, effectuate operations comprising:
   obtaining, from a computing system, a notification of a node device to be configured to host a blockchain;
   generating first data to verify that the node device remains available to host the blockchain,
      wherein the computing system determines whether the node device complies with a hosting verification condition using the first data, and
      wherein if the computing system determines that the node device does not comply with the hosting verification condition, then the computing system determines that a hosting infraction associated with the node device is detected; and
   in response to the node device being removed from a set of node devices hosting the blockchain based on the hosting infraction associated with the node device being detected, providing, to the computing system, a validation solution to confirm that an additional node maintains hosting of the blockchain,
   wherein:
   the additional node device provides, to the computing system, second data representing a first value to be verified with the validation solution, and
   whether the second data satisfies one or more criteria associated with the validation solution is determined using the second data and the validation solution.

2. The client device of claim 1, wherein the operations further comprise:
   providing a second value to the node device,
   wherein the second value is configured to be written to a block of the blockchain being hosted by the node device, and
   wherein the first data is generated using the second value.

3. The client device of claim 2, wherein generating the generating the first data comprises:
   obtaining a transaction identifier associated with a writing transaction of writing the second value to the block of the blockchain;
   obtaining a block identifier associated with the block that the second value is written to; and
   hashing the second value with the transaction identifier and the block identifier to generate the first data.

4. The client device of claim 1, wherein the operations further comprise:
   providing, using the notification, an additional request to the node device to create the blockchain;
   obtaining, from the node device, an address identifier for the blockchain; and
   providing a container smart contract to the node device,
   wherein the container smart contract generates a container for the blockchain on the node device and assigns a unique identifier to the container.

5. The client device of claim 4, wherein the operations further comprise:
   adding a record to the container indicating that the client device corresponds to a creator of the container; and
   adding a record to the container indicating an encrypted key for the container generated using the unique identifier and a public key associated with the creator.

6. The client device of claim 1, wherein the operations further comprise:
   providing, to the computing system, a request for hosting the blockchain; and
   obtaining, from the computing system, information associated with the node device,
   wherein the information is used for creating the blockchain on the node device.

7. The client device of claim 1, wherein the operations further comprise:
   providing, to the computing system, an additional request for the additional node device to host the blockchain, wherein the additional request comprises blockchain information indicating criteria for selecting the additional node device; and
   obtaining, from the computing system, additional information associated with the additional node device for enabling the additional node to host the blockchain.

8. One or more non-transitory computer-readable media storing computer program instructions that, if executed by one or more processor devices, effectuate operations comprising:
- causing, by the one or more processor devices, a node device to be removed from a set of node devices for hosting a blockchain in response to determining that the node device does not comply with a hosting verification condition;
- obtaining, by the one or more processor devices, a validation solution from a client device,
  - wherein the validation solution is to confirm that an additional node device maintains hosting of the blockchain;
- obtaining, by the one or more processor devices, first data representing a value to be verified with the validation solution; and
- determining, by the one or more processor devices, using the first data and the validation solution, whether the first data satisfies one or more criteria associated with the validation solution.

9. The one or more non-transitory computer-readable media of claim 8, wherein the operations further comprise:
- obtaining availability information associated with the set of node devices; and
- selecting at least one of the node device or the additional node device from the set of node devices using the availability information.

10. The one or more non-transitory computer-readable media of claim 8, wherein the operations further comprise:
- obtaining a request from the client device for the additional node device to host the blockchain,
  - wherein the request comprises blockchain information for selecting the additional node device; and
- providing information associated with the additional node device to the client device for enabling the additional node device to host the blockchain.

11. The one or more non-transitory computer-readable media of claim 8, wherein the operations further comprise:
- obtaining, from the client device, a request for hosting the blockchain;
- selecting the node device to host the blockchain from the set of node devices;
- providing information associated with the node device to the client device for creating the blockchain on the node device; and
- obtaining second data from the client device,
- wherein the determining whether the first data satisfies the one or more criteria associated with the validation solution uses the first data, the second data, and the validation solution.

12. The one or more non-transitory computer-readable media of claim 11, wherein the second data is associated with a validation value generated by the client device, and
- wherein the first data is generated using the validation value and the blockchain.

13. The one or more non-transitory computer-readable media of claim 11, wherein the causing the node device to be removed from a set of node devices for hosting the blockchain in response to determining that the node device does not comply with the hosting verification condition comprises:
- determining, using the first data, the second data, and the hosting verification condition, a hosting infraction associated with the node device, wherein the node device is caused to be removed from the set of node devices hosting the blockchain using the hosting infraction.

14. The one or more non-transitory computer-readable media of claim 13, wherein the hosting verification condition comprises a similarity threshold, and
- wherein the determining the hosting infraction associated with the node device comprises:
  - determining, using a difference between the first data and the second data, that a similarity value of the first data and the second data is less than the similarity threshold.

15. The one or more non-transitory computer-readable media of claim 8, wherein the operations further comprise:
- determining a number of occurrences of differing verification data obtained from the node device and the client device,
- wherein the node device is caused to be removed from the set of node devices if the determined number of occurrences is greater than or equal to a threshold number of occurrences of differing verification data.

16. The one or more non-transitory computer-readable media of claim 8, wherein the operations further comprise:
- determining a validation support means amount associated with the node device,
- wherein the node device is removed from the set of node devices if the validation support means amount associated with the node device is less than a validation support amount threshold amount.

17. A method implemented by one or more processor devices configured to execute one or more computer program instructions, the method comprising:
- causing, by the one or more processor devices, a node device to be removed from a set of node devices for hosting a blockchain in response to determining that the node device does not comply with a hosting verification condition;
- obtaining, by the one or more processor devices, a validation solution from a client device,
  - wherein the validation solution is to confirm that an additional node device maintains hosting of the blockchain;
- obtaining, by the one or more processor devices, first data representing a value to be verified with the validation solution; and
- determining, by the one or more processor devices, using the first data and the validation solution, whether the first data satisfies one or more criteria associated with the validation solution.

18. The method of claim 17, further comprising:
- obtaining availability information associated with the set of node devices; and
- selecting the node device from the set of node devices based onusing the availability information.

19. The method of claim 17, further comprising:
- obtaining a request from the client device for the additional node device to host the blockchain,
- wherein the request comprises blockchain information for selecting the additional node device; and
- providing information associated with the additional node device to the client device for enabling the additional node device to host the blockchain.

20. The method of claim 17, further comprising:
- obtaining, from the client device, a request for hosting the blockchain;
- selecting the node device to host the blockchain from the set of node devices;

providing information associated with the node device to the client device for creating the blockchain on the node device; and obtaining second data from the client device, wherein the determining whether the first data satisfies the one or more criteria associated with the validation solution uses the first data, the second data, and the validation solution.

* * * * *